J. F. O'CONNOR.
FRICTION SHOCK ABSORBING MECHANISM.
APPLICATION FILED MAR. 25, 1920.
1,395,351.
Patented Nov. 1, 1921.
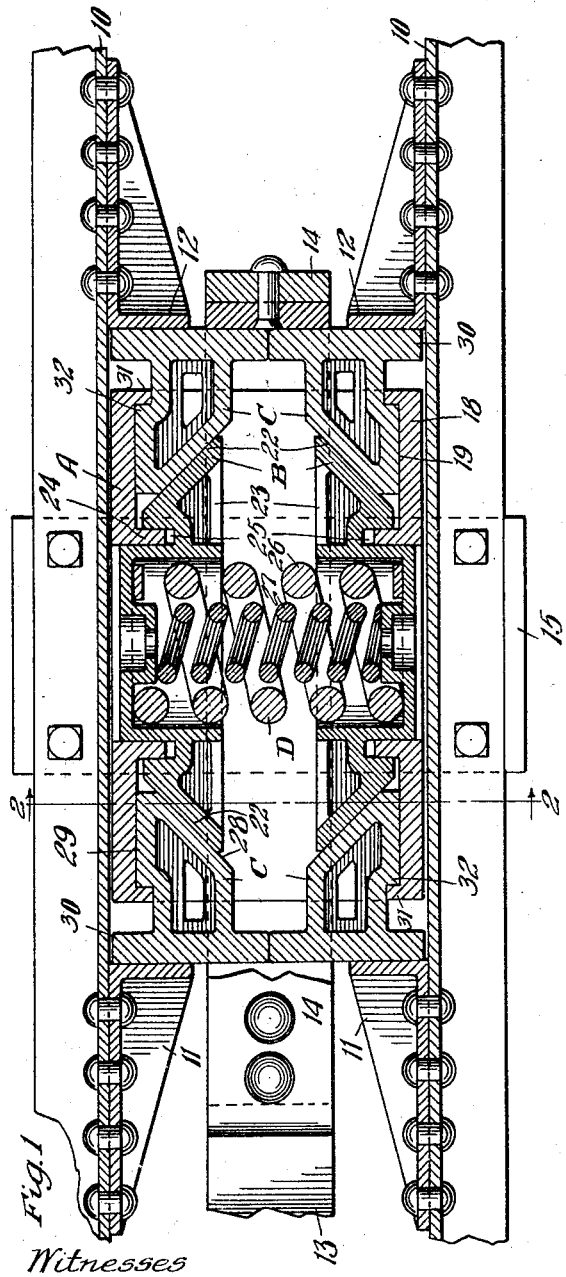
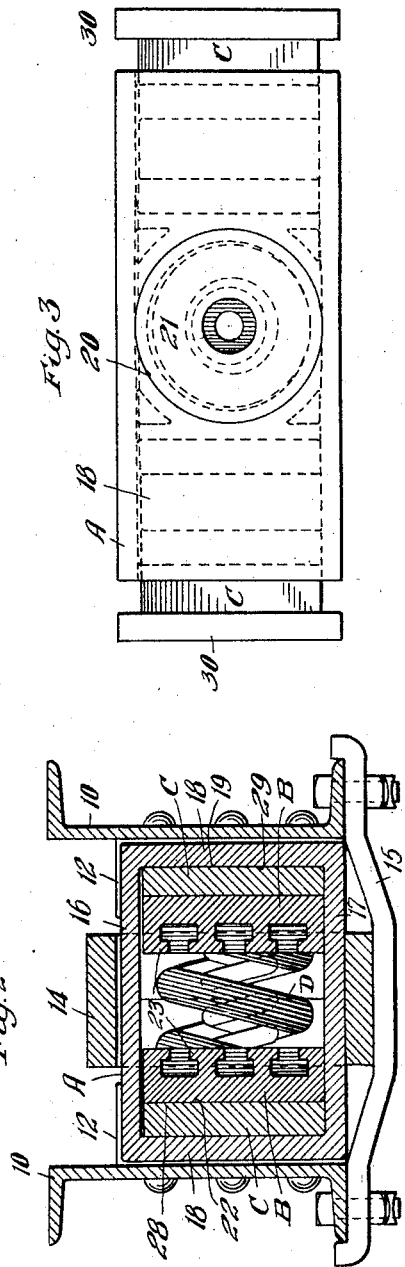
Witnesses
Wm. Geiger
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,395,351.     Specification of Letters Patent.     Patented Nov. 1, 1921.

Application filed March 25, 1920. Serial No. 368,669.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway cars wherein is obtained high capacity, large frictional wearing areas and a compact arrangement of parts.

In the drawing forming a part of this specification, Figure 1 is a longitudinal horizontal sectional view of a portion of a railway draft rigging showing my improvements in connection therewith. Fig. 2 is a vertical transverse sectional view taken substantially on the line 2—2 of Fig. 1. And Fig. 3 is a side elevational view of the shock absorbing mechanism proper shown in Fig. 1.

In said drawing, 10—10 denote channel shaped center or draft sills of a railway car arranged in the usual manner and on the inner faces of which are provided front stop lugs 11 and rear stop lugs 12 spaced the usual distance apart. A portion of the drawbar is indicated at 13, the same being operatively associated with the shock absorbing mechanism proper by means of a yoke 14 of well-known form. The parts of the mechanism may be supported by any suitable means such as the detachable saddle plate 15.

The shock absorbing mechanism proper, as shown, comprises, broadly, a friction shell or barrel designated by the reference A; a pair of friction shoes B—B; four end wedges C—C; and a transversely arranged spring D.

The friction shell or barrel A, as shown, is of the so-called double-ended type and preferably both ends will be cast in a single member, as shown in the drawing. Said shell A is of substantially rectangular cross section having upper wall 16, lower wall 17 and side walls 18—18. At each end, the shell A is provided with a pair of opposed interior friction surfaces 19—19 extending parallel to the center line of draft. Intermediate the sets of end friction surfaces 19, the shell A is provided with circular recesses on the sides as indicated at 20 to accommodate cylindrical caps or followers 21—21 which are formed preferably integrally with the friction shoes B. A sliding fit is obtained between the cylindrical caps 21 and the openings 20 in the shell so that the shoes B are guided as they move transversely of the center line of draft and of the shell A.

The friction shoes B are two in number, as shown, and each is provided at its ends with inclined or wedge friction faces 22—22 and, as heretofore mentioned, the shoes proper are preferably formed integrally with the spring caps 21 although it will be understood that various changes may be made in this respect without departing from the spirit of the invention. The wedge friction surfaces 22 of the shoes are suitably braced or strengthened by a plurality of ribs 23 shown most clearly in Fig. 2. In addition to the guiding effect obtained between the spring caps proper and the shell, heretofore described, other means for accomplishing the same result are provided in the form of inwardly extended flanges 24 on the shell which travel in corresponding recesses 25 provided on the outer sides of the shoes B.

In the arrangement shown, only a single spring D is employed, the same consisting of an outer heavy coil 26 and an inner nested lighter coil 27. As will be apparent from an inspection of Fig. 1, the ends of the spring D are centered by the spring caps 21. As will be understood by those skilled in the art, changes in the number or capacity of the springs D are within the purview of my invention.

The end wedges C are four in number and preferably of like construction. Each of said wedges is provided with an inclined or wedge friction surface 28 coöperable with the corresponding adjacent wedge surface 22 of one of the shoes. In addition, each wedge C is provided on its outer side with a longitudinally extending friction surface 29 coöperable with the corresponding friction surface 19 of the shell A. Each wedge C is provided also with a flange-like end indicated at 30 which is adapted to act as a part of a main follower. As clearly shown in the drawing, the flange-like ends 30 are separated normally from the ends of the shell so as to provide for the necessary movement of the wedges during the compressive stroke. It will be noted that the wedges are independently formed so that, as wear occurs on the various friction surfaces, the wedges C may adjust themselves by moving slightly laterally outward so as to always obtain the desired frictional action on all friction surfaces.

It is highly desirable that the shock absorbing mechanism be made self-contained, that is, when all the parts are assembled they will remain so and can be shipped as a unit. To this end, the shell A is provided at each end with inturned flanges 31 with which coöperate corresponding shoulders 32 on the respective wedges. With this arrangement, it is evident that the wedges are limited in their outward movement with respect to the shell A and, when the wedges C are engaged by the shoes B, the wedges cannot come out and hence the entire mechanism is self-contained.

In assembling the mechanism, the two shoes B and interposed spring will be inserted within the shell A while the spring is under compression. The shoes will be inserted until the spring caps 21 thereof are in alinement with the openings 20 and the shoes then released, thus permitting the spring to expand and force the shoes outwardly to their normal position. The wedges can then be inserted by forcing them inwardly a short distance and compressing the spring D until such time as the shoulders 32 of the wedges slip behind the flanges 31 of the shell A.

In the arrangement shown, the spring D extends horizontally and the friction surfaces 19 of the shell are in horizontal alinement but, as will be understood by those skilled in the art, the position of the entire mechanism may well be turned through an angle of 90° without departing from the spirit of the invention. Other changes and modifications such as the formation of followers separate from the wedges, will readily suggest themselves to those skilled in the art and all changes and modifications that come within the scope of the claims appended hereto are contemplated.

I claim:

1. In a friction shock absorbing mechanism, the combination with a casting having opposed sets of interior longitudinally extending friction surfaces at each end thereof; of a pair of friction shoes disposed within said casting, each friction shoe having a wedge face at each end thereof; coöperating means on said casting and each shoe for guiding the latter in a direction transversely of the axis of the casting, said means preventing longitudinal movement of the shoes relatively to the casting; spring means interposed between said shoes; and a pair of wedges at each end of said casting, each wedge having a friction surface coöperable with one of the friction surfaces of the casting and a wedge face coöperable with one end of a shoe.

2. In a friction shock absorbing mechanism, the combination with a friction shell having interior friction surfaces extending longitudinally thereof; of friction shoes disposed within the shell and movable transversely of the axis thereof, said shoes having wedge shaped ends; spring means interposed between said shoes; end wedges, said end wedges having friction surfaces coöperable with the friction surfaces of the shell and wedge faces coöperable with the shoes; coöperating shoulders on the shell and wedges arranged to limit the outward movement of the wedges with respect to the shell; and transversely extending coöperating flanges and slots provided on the shell and shoes arranged to guide the shoes in a direction transverse to the axis of the shell and maintain the parts in assembled relation.

3. In a friction shock absorbing mechanism, the combination with a casting having opposed sets of longitudinally extending friction surfaces at each end thereof; a pair of friction shoes disposed within said casting, each of said shoes having wedge shaped ends and provided also with an integral spring seat; coöperating transversely extending flanges on the casting and transversely extending slots in the shoes to guide the latter in a direction transversely of the axis of the casting; a coil spring interposed between said shoes having its ends seated in said seats; a pair of independently formed wedges at each end of the casting, each of said wedges having a friction surface coöperable with one of the friction surfaces of the shell and a wedge face coöperable with an end of a shoe; and coöperating shoulders on the casting and wedges arranged to limit the outward movement of the wedges with respect to the casting.

4. In a friction shock absorbing mechanism, the combination with a casting having longitudinally extending friction surfaces at each end thereof and provided with transversely extending opposed openings intermediate said friction surfaces; of a pair of friction shoes disposed within said casting, each shoe having wedge-shaped ends and a spring cap intermediate said wedge-shaped ends, said cap extending into one of said openings of the casting; spring means interposed between said shoes, said spring means being centered by and seated within said caps; and a pair of indepedently formed wedge-shoes at each end of the casting, each of said wedge-shoes having a friction surface coöperable with a friction surface of the shell and a wedge face coöperable with an end of a shoe.

In witness that I claim the foregoing I have hereunto subscribed my name this 11 day of Mch. 1920.

JOHN F. O'CONNOR.

Witness:
CARRIE GAILING.